United States Statutory Invention Registration [19]

[11] Reg. Number: H736

Bamberger [43] Published: Feb. 6, 1990

[54] PROCESS FOR MAKING BORON NITRIDE USING SODIUM CYANIDE AND BORON

[75] Inventor: Carlos E. Bamberger, Oak Ridge, Tenn.

[73] Assignee: The United Stated of America as represented by the Department of Energy, Washington, D.C.

[21] Appl. No.: 19,835

[22] Filed: Feb. 27, 1987

[51] Int. Cl.[4] ..... C01G 21/64

[52] U.S. Cl. ..... 423/290; 423/323; 423/409

[58] Field of Search ..... 423/290, 409, 323

[56] References Cited

U.S. PATENT DOCUMENTS

| | | | |
|---|---|---|---|
| Re. 27,608 | 4/1973 | Lubatti et al. | 423/290 |
| 1,135,232 | 4/1915 | Weintraub | 423/290 |
| 1,157,271 | 10/1915 | Weintraub | 423/290 |
| 1,464,292 | 8/1923 | Peacock | 423/290 |
| 2,834,650 | 5/1958 | Conant et al. | 423/290 |
| 2,839,366 | 6/1958 | Komlet | 423/290 |
| 2,865,715 | 12/1958 | Kamlet | 423/290 |
| 2,922,699 | 1/1960 | Lauzau | 423/290 |
| 2,959,469 | 11/1960 | May et al. | 423/290 |
| 2,974,013 | 3/1961 | Litz | 423/290 |
| 3,208,824 | 9/1965 | Lipp | 423/290 |
| 3,216,666 | 11/1965 | Svensson et al. | 241/176 |
| 3,241,919 | 3/1966 | O'Connor | 423/290 |
| 3,415,625 | 12/1968 | Babl et al. | 423/290 |
| 3,692,474 | 9/1972 | Arber et al. | 423/290 |

FOREIGN PATENT DOCUMENTS

| | | | |
|---|---|---|---|
| 1513791 | 2/1968 | France | 423/290 |
| 4955704 | 5/1974 | Japan | 423/290 |
| 58-060603 | 4/1983 | Japan | 423/290 |
| 16468 | 1/1914 | United Kingdom | 423/290 |
| 742326 | 12/1955 | United Kingdom | 423/290 |

OTHER PUBLICATIONS

John H. Perry editor, *Chemical Engineers' Handbook* McGraw-Hill Book Company, Inc., New York, 1950 p. 115.

Tiede and Buscher, Ber. 53, 2206 (1920).

E. Tiede and H. Tomaschek, Z. Anorg, u. Allg. Chemie. 4Z (1925) pp. 111-122.

Vasovic and Stoiakovic, J. Am. Ceram. Soc., C-23 (1987).

*Primary Examiner*—Stephen J. Lechert, Jr.
*Assistant Examiner*—Jackson Leeds
*Attorney, Agent, or Firm*—Katherine P. Lovingood; Stephen D. Hamel; Judson R. Hightower

[57] ABSTRACT

This a very simple process for making boron nitride by mixing sodium cyanide and boron phosphate and heating the mixture in an inert atmosphere until a reaction takes place. The product is a white powder of boron nitride that can be used in applications that require compounds that are stable at high temperatures and that exhibit high electrical resistance.

6 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR MAKING BORON NITRIDE USING SODIUM CYANIDE AND BORON

This invention relates to a process for making the compound boron nitride and was developed pursuant to a contract with the U.S. Department of Energy.

BACKGROUND OF INVENTION

Hexagonal Boron Nitride (BN) is used in many applications that require container material stable at high temperature or a high resistance electrical insulator. This material is also a very soft solid and has a tendency to flake and can be used as a solid lubricant similar to graphite.

Due to the significant industrial interest in BN, a very large number of reactions have been reported for its synthesis. Examples include a solid-gas phase reaction involving nitrogen or gaseous ammonia and silicon tetrachloride which has the disadvantages of being a very expensive reaction and requiring silicon tetrachloride which is difficult to make.

Another method involves the reaction of oxygen-containing boron compounds with cyanides. Such reactions take advantage of the strong reducing conditions created by the cyanides as well as their ability to provide nitrogen to the medium. Oxide compounds of boron most frequently used are $B_2O_3$, $H_3BO_3$ and $Na_2B_4O_7$ which are reacted directly with NaCN or in conjunction with a sodium acceptor such as $SiO_2$. This process has the disadvantage of having a hydrated reactant, the oxygen containing boron compound, which must be dried in order to remove the water of hydration. Additionally, some of the boron is converted to sodium borate thereby lowering the boron nitride yield. Also, if $SiO_2$ is used as a sodium acceptor, it is difficult to purify the product since some sodium silicates are insoluble in water. Therefore, there is a need to provide a process for making boron nitride that is simple and efficient and inexpensive.

SUMMARY OF THE INVENTION

In view of the above described needs, it is an object of this invention to provide a process for making boron nitride without using a reactant that forms a hydrate, thus requiring rigorous drying prior to the reaction.

It is also an object of this invention to provide an inexpensive process for making boron nitride.

A further object of this invention is to maximize the yield of boron nitride from the boron containing starting material.

A final object of this invention is to provide a simple process for making boron nitride that is suitable for commercialization.

Upon further study of this specification and appended claims further objects and advantages of this invention will become apparent to those skilled in the arts.

These objects have been achieved by providing a process for making boron nitride that consists of mixing NaCN and $BPO_4$ and heating the mixture to a temperature sufficient to cause the reactants to react. The preferred temperature is about 1,050° C. The product BN can be separated from the phosphorus-containing by-products by extraction of the phosphates with water. Excess reactants remaining will also be extracted in the water wash. The preferred temperature of the water wash is 25° C. or more.

DETAILED TO THE DESCRIPTION OF THE PREFERRED EMBODIMENT

The chemical boron phosphate has little common usage in the chemical arts. In the past it has been used as a catalyst or catalyst support and in chemical research to make metal phosphates, but other useful applications of this chemical are not found in the literature. Using boron phosphate to make boron nitride is significant considering its otherwise lack of utility and the ease with which boron phosphate is made by simply mixing boric acid and phosphoric acid and heating the mixture to reaction. It can also be purchased commercially from Alfa Products (Danvers, MA, 01923), STREM (Newburyport, MA, 01950) and Atomergic Chemetals Corp. (Plainview, NY, 11801), among others.

The reaction for making BN is very simple requiring only that the reactants be mixed together and heated to reaction temperature. Isolating the product is simple as well since the by-products are all soluble in water leaving the solid boron nitride product. The only reaction conditions that require care are the composition of the crucible and the reaction atmosphere.

The crucible cannot be metal or quartz due to cyanide's tendency to attack these materials. However, vitreous carbon graphite, BN and perhaps high fired alumina, are suitable materials for the reaction crucible.

It is also critical to conduct the reaction in an inert atmosphere because the cyanide will react with air. The inert atmosphere is provided by an inert gas such as argon, helium or diatomic gas such as nitrogen. The reaction cannot be performed in a vacuum, however, because the sodium cyanide will evaporate.

The applicants did several studies to determine the optimum ratio of NaCN to $BPO_4$. Whenever the cyanide and the boron phosphate are brought together and heated to reaction temperature, a reaction will take place; therefore, there is no minimum or maximum ratio of reactants required. However, the optimum ratio is one that will minimize the presence of free phosphorus and drive a maximum amount of the cyanide to form product, since both phosphorous and cyanide are dangerous elements that are best removed from the system. Additionally, expending all the cyanide will increase the yield relative to the cyanide reactant.

Laboratory tests performed on the products of the reaction provided results that made it possible to define the stoichiometry of the reaction and select optimum parameters for the synthesis of boron nitride. Equations I, II, and III are representative of the reactions that take place under varying ratios of NaCN to $BPO_4$.

for $1 < X < 1.455$ $$X\mathrm{NaCN} + \mathrm{BPO_4} = \mathrm{BN} + \frac{8X-8}{10}\mathrm{Na_4P_2O_7} + X\mathrm{CO} + \frac{32-22X}{10}\mathrm{NaPO_3} + \frac{6X-6}{10} + \frac{X-1}{2}\mathrm{N_2} \quad \text{I}$$

for $1.455 < X < 1.714$ $$X\mathrm{NaCN} + \mathrm{BPO_4} = \mathrm{BN} + \frac{33X-48}{15}\mathrm{Na_3PO_4} + \frac{12-7X}{5}\mathrm{Na_4P_2O_7} + X\mathrm{CO} + \frac{9X-9}{15} + \frac{X-1}{2}\mathrm{N_2} \quad \text{II}$$

for $1.714 < X < 2$

-continued $$XNaCN + BPO_4 = \qquad \text{III}$$

$$BN + \frac{X}{3} Na_3PO_4 + \frac{12 - 4X}{3} CO + \frac{3 - X}{3} P + \frac{X - 1}{2} N_2 + \frac{7X - 12}{3} C$$

Although boron nitride will be obtained from NaCN and BP04 when both are present in the reactor regardless of the ratio, the preferred ratio of $NaCN/BPO_4$ is one or greater and the optimum ratio is in the range from 1 to 1.2 since no or insignificant amounts of phosophorus are evolved when the reactants are present in these proportions. Higher ratio values of 1.71 to 2 leave a residue of carbon mixed with boron nitride resulting in grey cast to the final product.

EXAMPLE

Various ratios of NaCN and $BPO_4$ in a combined weight of one to two grams were mixed by grinding and placed in crucibles, made preferably of graphite, that were tall to avoid expulsion of the mixture from the crucible during reaction and heated to a temperature of about 1,050° C. under flowing nitrogen for about twenty hours although reaction is complete within 3–5 hours at this temperature. The products were cooled and extracted with hot water to remove the soluble phosphates and unreacted starting materials and the solid residue was further washed with acetone and dried at 120° C. to a constant weight.

The product boron nitride appears to consist of irregularly shaped particles of one micrometer or less in the longest direction as observed in the scanning electron microscope.

The BN product has significant commercial use and this reaction provides a very simple inexpensive process for making the powder and can be easily adapted to commercialization.

I claim:

1. A process for making boron nitride comprising mixing sodium cyanide with boron phosphate and heating said mixture in a nonvacuum atmosphere of gas selected from the group nitrogen or an inert gas to a temperature and for a length of time suitable to cause reaction and subsequentialy extracting said by-products and unreacted starting material with water.

2. The process of claim 1 wherein said temperature is about 1,050° C. and said time is three hours or longer.

3. The process of claim 1 wherein said inert atmosphere is selected from the group argon and helium.

4. The process of claim 1 wherein the ratio of said sodium cyanide to said boron phosphate is 1 or greater.

5. The process of claim 4 wherein said ratio is from 1 to 1.2.

6. The process of claim 1 wherein said water is at a temperature 25° C. or more.

* * * * *